(12) United States Patent
Poutievski et al.

(10) Patent No.: US 9,705,740 B2
(45) Date of Patent: Jul. 11, 2017

(54) USING UNIFIED API TO PROGRAM BOTH SERVERS AND FABRIC FOR FORWARDING FOR FINE-GRAINED NETWORK OPTIMIZATIONS

(71) Applicant: Google Inc., Mountain View, CA (US)

(72) Inventors: Leon Poutievski, Santa Clara, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 475 days.

(21) Appl. No.: 14/276,399

(22) Filed: May 13, 2014

(65) Prior Publication Data

US 2015/0229522 A1    Aug. 13, 2015

Related U.S. Application Data (60) Provisional application No. 61/937,933, filed on Feb. 10, 2014.

(51) Int. Cl.
| | |
|---|---|
| *G06F 15/16* | (2006.01) |
| *H04L 12/24* | (2006.01) |
| *G06F 13/38* | (2006.01) |
| *H04L 12/717* | (2013.01) |
| *H04L 12/70* | (2013.01) |

(52) U.S. Cl.
CPC ........ *H04L 41/0813* (2013.01); *G06F 13/385* (2013.01); *H04L 45/42* (2013.01); *H04L 47/00* (2013.01); *G06F 2213/3808* (2013.01)

(58) Field of Classification Search
CPC ..... H04L 67/327; H04L 45/306; H04L 45/00; H04L 47/2475
See application file for complete search history.

(56) References Cited

U.S. PATENT DOCUMENTS

| | | |
|---|---|---|
| 6,587,890 B1 | 7/2003 | Kult et al. |
| 7,142,650 B1 | 11/2006 | Kult et al. |
| 7,742,471 B2 | 6/2010 | Sreejith et al. |
| 7,861,247 B1 * | 12/2010 | Santos .................. G06F 9/5011 700/28 |
| 8,441,961 B1 | 5/2013 | Amberden et al. |

(Continued)

OTHER PUBLICATIONS

International Search Report and Written Opinion for International Application No. PCT/US2015/015190, mailed on May 7, 2015.

*Primary Examiner* — Tauqir Hussain
*Assistant Examiner* — Kamran Mohammadi
(74) *Attorney, Agent, or Firm* — McDermott Will & Emery LLP (57) ABSTRACT

As an overview, the present disclosure presents a system for increasing network optimization. In particular, the disclosure discusses a unified system for control of data routing in a dynamic network. In some implementations, edge devices (i.e., hosts or exterior switches) are interconnected through a network fabric (i.e., a plurality of interior switches). The hosts and switches include forwarding engines, which determine the next destination of incoming traffic. The disclosure discusses a network controller that collects application requirements and programs the forwarding engines of the edge devices and the network fabric responsive to the application requirements.

17 Claims, 3 Drawing Sheets

(56) References Cited

U.S. PATENT DOCUMENTS

| | | | |
|---|---|---|---|
| 2009/0219937 A1* | 9/2009 | Liu | H04L 45/302 370/392 |
| 2011/0228781 A1 | 9/2011 | Izenberg et al. | |
| 2013/0058255 A1 | 3/2013 | Casado et al. | |
| 2013/0212245 A1 | 8/2013 | Koponen et al. | |
| 2013/0219046 A1* | 8/2013 | Wetterwald | H04L 45/38 709/224 |
| 2015/0009830 A1* | 1/2015 | Bisht | H04L 47/125 370/236 |

\* cited by examiner

USING UNIFIED API TO PROGRAM BOTH SERVERS AND FABRIC FOR FORWARDING FOR FINE-GRAINED NETWORK OPTIMIZATIONS

RELATED APPLICATIONS

The present application claims priority to U.S. Provisional Patent Application No. 61/937,933 filed on Feb. 10, 2014, and titled "USING UNIFIED API TO PROGRAM BOTH SERVERS AND FABRIC FOR DATA FORWARDING," which is herein incorporated by reference in its entirety.

BACKGROUND

Datacenters include a large number of interconnected host devices. The host devices often run multiple applications, and each of the applications have specific network requirements. In standard datacenter networks, data routes through a network are controlled by switches irrespective of the specific network requirements of the applications.

SUMMARY

According to one aspect of the disclosure, a method of controlling network routes includes providing a network. The network includes a plurality of edge devices and a plurality of core switches. Each of the plurality of edge devices executes an application having an application requirement. Each of the plurality of edge devices also have a forwarding engine. The plurality of core switches interconnect the plurality of edge devices. The network also includes a network controller coupled to each of the plurality of edge devices and the plurality of core switches. The method also includes receiving, by the network controller, the application requirement of the application executing on each of the plurality of edge devices. The method further includes determining, by the network controller, a plurality of routes responsive to the received application requirements. Finally, the method includes programming, by the network controller, the forwarding engine of each of the plurality of edge devices and a forwarding engine of each of the plurality of core switches responsive to the determined plurality of routes.

According to another aspect of the disclosure, a system for controlling network routes includes a network. The network includes a plurality of edge devices, each of the plurality of edge devices executing an application having an application requirement. Each of the plurality of edge devices also has a forwarding engine. The network further includes a plurality of core switches interconnecting the plurality of edge devices. The system also includes a network controller coupled to each of the plurality of edge devices and the plurality of core switches. The network controller is configure to receive the application requirement of the application executing on each of the plurality of edge devices. The network controller is also configured to determine a plurality of routes responsive to the received application requirements, and program the forwarding engine of each of the plurality of edge devices and a forwarding engine of each of the plurality of core switches responsive to the determined plurality of routes.

BRIEF DESCRIPTION OF THE DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

In datacenters, an application's performance may be adversely affected when the network cannot route data in a manner that meets the network requirements of the application. The problem may be compounded when different applications, with different types of network requirements, are all executing within the same datacenter.

As an overview, the present disclosure presents a system for increasing network optimization. In particular, the disclosure discusses a unified system to control data routing in a dynamic network. In some implementations, edge devices (i.e., hosts or exterior switches) are interconnected through a network fabric (i.e., a plurality of interior switches). The hosts and switches include forwarding engines, which determine the next destination of incoming traffic.

Figure 1:
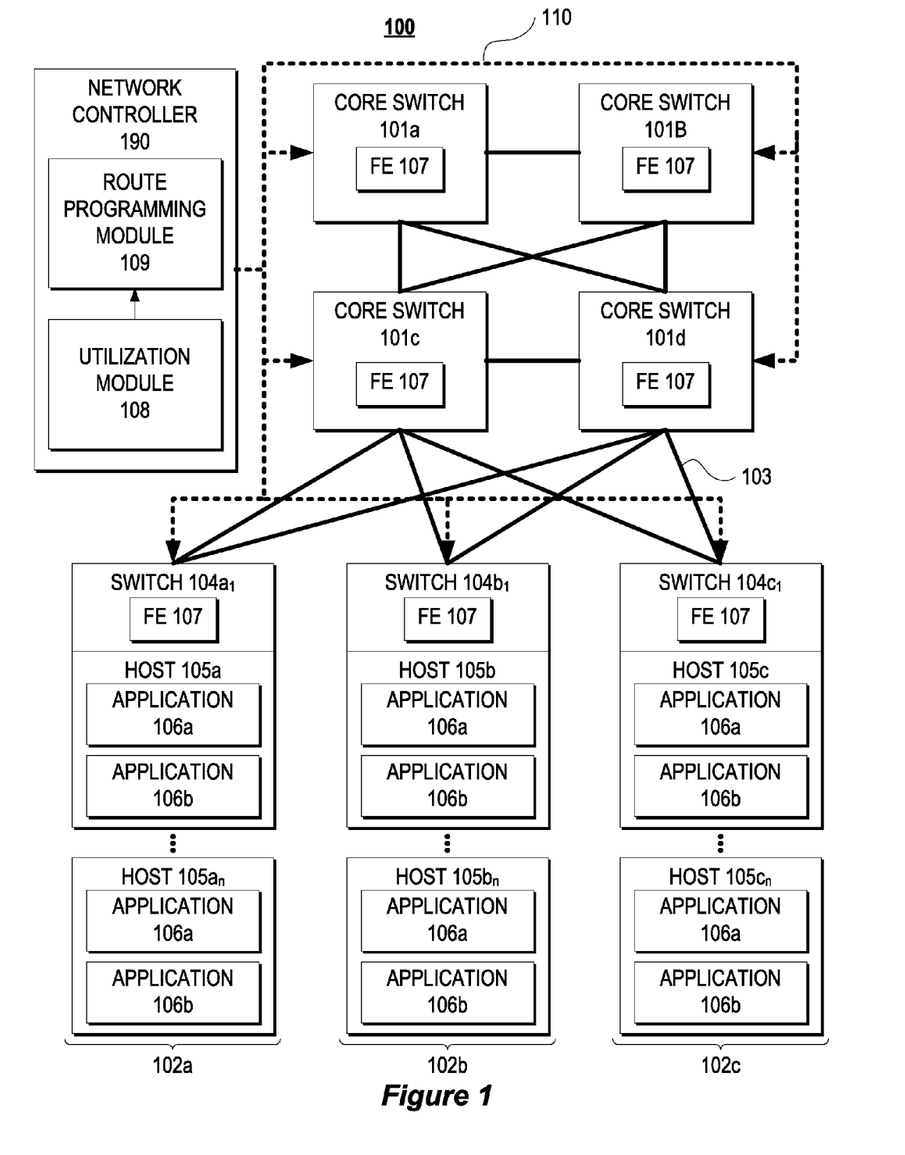
FIG. 1 illustrates an example datacenter network.

FIG. 1 illustrates an example data center network 100. The data center network 100 includes a logically centralized controller 190. The data center network 100 also includes a plurality of core switches 101, each containing a forwarding engine 107. The network 100 further includes a plurality of network edge devices 102. Each of the network edge devices 102 are coupled to a switch 104. Each of the network edge devices 102 include a plurality of hosts 105 executing one or more applications 106. The core switches 101 and edge devices 102 are connected by a plurality of data links 103. The core switches 101 and edge devices 102 are connected to the network controller 190 by links 110. In some implementations, the network controller 190 is connected to the network through one or more data links 103, and the network controller 190 uses the data link 103 to communicate with each of the core switches 101 and edge devices 102.

The network 100 includes a plurality of core switches 101. In some implementations, the network 100 includes thousands, tens of thousands, or hundreds of thousand core switches 104. The core switches 101 are routers, switching chips, collections of servers, or any other device or arrangement of devices capable of routing information from one port to another. In some implementations, the core switches 101 form one or more aggregation layers in the network 100, and route data between the plurality of edge devices 102. For example, core switch 101c may be used to route data from edge device 102a to edge device 102b.

The core switches 101 (and below described switches 104) include forwarding engines 107. The forwarding engines 107 process incoming data packets to determine a data packet's next destination or a route for the data packet. The forwarding engine 107 extracts address information from the data packet (e.g., an IP address or other data from a packet header) and processes it to determine how to handle the data packet (e.g., to which core switch 101 or edge devices 102 the data packet should next be forwarded) using the specialized data structures and methods described herein. In some implementations, the forwarding engine 107 references a routing table, forwarding information base, routing information base, or similar data structure (generally referenced as a data routing structure herein) that stores routing data. In some implementations, the data routing structure identifies a plurality of routes that are configured responsive to the different requirements of the applications 106.

In some implementations, the forwarding engines 107 are implemented as a special purpose circuit (e.g., an ASIC). In some implementations, the forwarding engines 107 is implemented as a set of computer executable instruction sets stored in computer accessible memory and executed by one or more computing processors.

The network 100 also includes a plurality of edge devices 102. Each of the edge devices 102 include a switch 104 and a plurality of hosts 105, each of which are executing one or more applications 106. The hosts 105 of a given edge device 102 are interconnected through the switch 104.

Each of the edge devices 102 include a number (n) of hosts 105. The hosts 105 are servers or other computing systems, such as those described below. In some implementations, the hosts 105 of a given edge device 102 are arranged in server racks and each of the server racks, communicate with the core switches 101 through the switch 104. In some implementations, a plurality of edge devices 102 are grouped together to form a superblock of edge device 102. In some implementations, the edge devices 102 of a superblock are each coupled to the same aggregation layer device (e.g., core switch 101).

Each of the hosts 105 execute one or more applications 106. The applications 106 are collections of processor executable instructions stored on a computer readable medium. The applications 106 may also be referred to as programs, software, software applications, scripts, or code. Each of the applications 106 route data through the network 100 and have hard and soft network related requirements. The requirements can include bandwidth requirements, latency requirements, or special service requirements, such as SSL, load balancing, specific paths through intermediate nodes, or other special services that may be required to process the data. Soft requirements are the network requirements under which the application's performance in substantially optimal. Accordingly, an application 106 can still proceed when the soft requirements are not met. However, hard requirements are the network requirements that must be met for the application 106 to proceed. For example, a host 105 may be executing a communication application that requires low latency data transfer with another host 105. In some implementations, the switch 104 is a virtual switch and executes on a host 105 like an application 106.

As described above, the applications 106 route data through the network 100. In some implementations, the applications 106 access the data routing structures provided by the network controller 190 to determine a route for the data packets it generates. For example, the data routing structure may include different routes pursuant to the different requirements the applications 106 have at different times. As the application 106 generates data packets, the application 106 constructs the data packet such that the data packet is properly routed through the network by the switches 101 and 104. In some implementations, the applications 106 encode the route information in the header of the packet. In some implementations, the applications 106 (or other components of the network 100) use source routing, dynamic source routing, multiprotocol label switching (MPLS), generic routing encapsulation (GRE), loose source routing, or a combination thereof to route data through the network 100. For example, the application 106 can incorporate routing information in each of its data packets using a set of MPLS stacked static labels or a set of nested GRE headers. As an example using GRE, the application 106, referencing a data routing structure, determines an appropriate route for its data responsive the present requirements of the application 106. The application 106 then encapsulates the route information in a plurality of nested headers. The data packet is then transmitted, by the switch 104, to a first core switch 101. At each hop (e.g., switch 101 along the route), the receiving switch exposes the next encapsulated header to identify the next hop, until the final destination is reached.

Each of the plurality of edge devices 102 also include a switch 104. In some implementations, the switches 104 are top-of-rack (TOR) switches that route data internally within a given edge device 102 (i.e., between the plurality of hosts 105 of an edge device 102) and externally to the given edge device 102 (i.e., to a specific core switch 101). In some implementations, the switches 104 of the edge devices 102 are routers, switching chips, or any other device or arrangement of devices capable of routing information from one port to another. In some implementations, the switches 104 of the edge devices 102 are virtual switches and the core switches 101 are physical switches.

The network 100 also includes a network controller 190. The network controller 190 includes a utilization module 108 and a route programming module 109. The components of the network controller 190 are described in turn below, but in general the network controller 190 increases the applications' utilization of the network 100 by programming the switches 101 and the edge devices 102 with a single, unified API to route responsive to the application requirements. In some implementation, the network controller 190 reduces the complexity of datacenter network configurations. For example, rather than provisioning specific regions of a network to meet specific application requirements and then placing new hosts in the network responsive to applications they execute, hosts can be added to a network not specifically provisioned to meet their application requirements. The specific application requirements may then be met by the network controller configuring specific routes for each of the application requirements.

The components of the network controller 190 can be implemented by special purpose logic circuitry (e.g., an FPGA (field programmable gate array), an ASIC (application specific integrated circuit)) or a general purpose computing device.

In some implementations, the network 100 includes a plurality of network controllers 190. When a network 100 includes a plurality of network controllers 190, each of the plurality of network controllers 190 control only a portion of the network 100. For example, each network controller 190 may generate the routes for the edge devices 102 belonging to a specific superblock. In this example, if data is to be routed to a destination host within a second superblock, the first network controller provides a route to the second superblock, but once the data reaches the second superblock a second network controller provides the route to the destination host.

The network controller 190 includes a utilization module 108 and a route programming module 109. The utilization module 108 periodically retrieves (or is sent) the hard and soft requirements of each of the applications 106 executing in the network 100. In some implementations, the utilization module 108 is a component of the network controller 190, and in other implementations the utilization module 108 is located separately from the network controller 190. In some implementations, the utilization module 108 includes an API, which enables the applications 106 to interface with the utilization module 108. In some implementations, the utilization module 108 provides feedback regarding the network utilization to the applications 106. For example, the utilization module 108 may inform a host 105 when the network 100 has sufficient resources available to meet the hard and/or soft requirements of an application 106 the host 105 wishes to execute. Furthering the example, a first application may be executing, which requires large amounts of bandwidth to properly execute. The utilization module 108 may monitor the network and notify the host 105 (or the first application) when sufficient bandwidth is available in the network 100 for the first application to properly execute. In some implementations, the utilization module 108 also collects information regarding the network 100. For example, the utilization module 108 may collect information about core switches 101, edge devices 102, and links coming online or going offline.

The network controller also includes a route programming module 109. As described above, the route programming module 109 programs, using a single, unified API, the data routing structures and the forwarding engines 107 of the network 100. In some implementations, the route programming module 109 is a special purpose circuit (e.g., an ASIC), and in other implementations, the route programming module 109 is implemented as a set of computer executable instruction sets stored in computer accessible memory and executed by one or more computing processors. The route programming module 109 programs the data routing structures of each switch 101 and 104 using the same application programming interface (API) or protocol such as, but not limited to, OpenFLow, Open vSwitch Database Management Protocol (OVSDB), Network Configuration Protocol (NETCONF), Cisco Location Identifier Separation Protocol (LISP), or Border Gateway Protocol (BGP). The route programming module 109 assimilates the utilization information gathered by the utilization module 108 to generate a plurality routes to meet the plurality of application requirements. The route programming module 109 then programs each of the switches 101 and edge devices 102 of the network 100 with the plurality of generated routes. In some implementations, the network controller 190 programs each forwarding engine 107 with a plurality of data routing structures, which the forwarding engines use responsive to the current application requirements. For example, the switch 104 are programmed with a first data routing structure to be used under a first set of requirements (e.g., present and future application requirements) and a second data routing structure to be used under a second set of requirements. Then, responsive to the requirements of the edge devices 102, the edge devices 102 selects which data routing structure to when forwarding a specific data packet. In some implementations, the one or more data routing structures for a single switch are stored in a single routing table or similar structure. In these implementations, the forwarding engine 107 uses a hash or other function to select the appropriate route or next hop for a data packet. The network controller 190 and its components are described further in relation to the methods illustrated in FIGS. 2 and 3.

Figure 2:
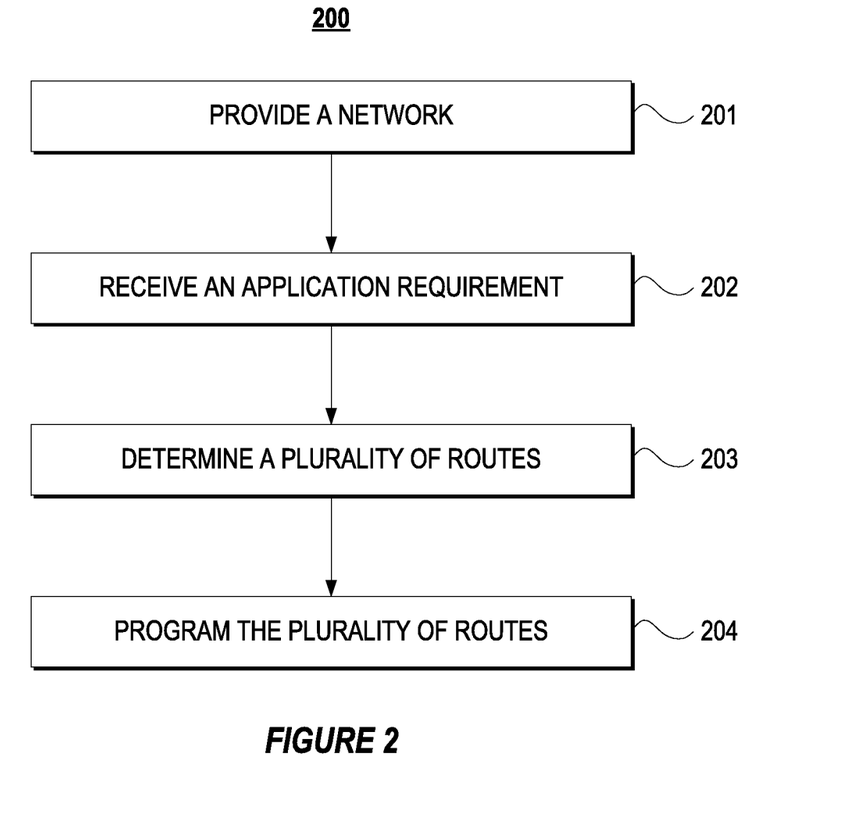
FIG. 2 illustrates a flow chart of a method for controlling network routes using the network controller illustrated in FIG. 1.

FIG. 2 illustrates a flow chart of a method 200 for controlling network routes. First, a network is provided (step 201). Then, a network controller receives an application requirement (step 202). The network controller then determines a routes responsive to the received application requirement (step 203). Finally, the switches of the network are programmed with the plurality of routes (step 204).

As set forth above, and referring to FIG. 1, a network is provided (step 201). As illustrated in FIG. 1, the network includes a plurality of interconnected core switches 101 and edge devices 102. The edge devices 102 execute one or more applications 106. Each of the applications 106 have one or more requirements, such as, but not limited to, bandwidth requirements and latency requirements.

Next, a network controller receives at least one application requirement (step 202). The network controller, via the utilization module, may provide the applications executing on the edge devices with an API, which enables the applications to update the network controller with their application requirements. In some implementations, the applications provide the utilization module with its requirements in substantially real time (i.e., as the application's requirements evolve), and in other implementations, the application provides the network controller with its requirements during an initiation phase of the application or at predetermined intervals. The application requirements include present and future requirements such, but not limited to capacity, bandwidth, latency, and special services like SSL.

Responsive to receiving the requirements, the network controller determines a plurality of routes (step 203) and programs the hosts and forwarding engines with the routes (step 204). In an example where the applications provide the network controller with their requirements in substantially real time, as a first edge device processes data that needs to be transferred to a second edge device, the first edge device may indicate to the network controller that the first edge device will shortly need a large amount of bandwidth to transfer the data. Accordingly, the network controller determines new routes for the first edge device to use and programs the edge device with the updated data routing structure, which includes routes configured to provide the edge device the required bandwidth.

Figure 3:
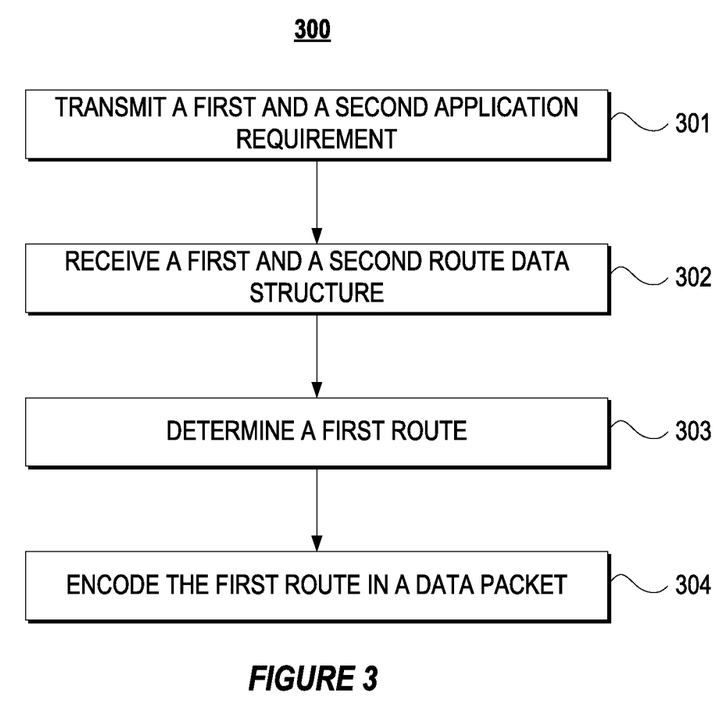
FIG. 3 illustrates a flow chart of a method for routing data through a network using the network controller illustrated in FIG. 1.

FIG. 3 illustrates a flow chart of a method 300 of routing data through a network. First, an edge device transmits a first application requirement and a second application requirement to a network controller (step 301). Then, the edge device receives a first data routing structure and a second data routing structure (step 302). Next, the edge device determines a first route (step 303). The edge device then encodes the data packet with the selected route (step 304).

As set forth above, the method 300 includes transmitting a first and a second application requirement to the network controller (step 301). As described above, each edge device includes one or more hosts executing one or more applications. The edge device transmits the requirements of the applications it is executing to the network controller. For example, and referring to FIG. 1, suppose that host 105(A) is running a first application and a second application.

Assume the first application is latency sensitive and the second application is bandwidth sensitive (i.e., requires a large amount of bandwidth). The host then transmits these specific bandwidth and latency requirements to the network controller.

Next, the edge device receives a first data routing structure and a second data routing structure configured responsive to the first and second application requirements, respectively (step 302). As described above, the network controller generates data routing structures that include different routes responsive to the different application requirements. In some implementations, the data routing structures are generated with a prediction-based traffic algorithm. The prediction-based traffic algorithm collects performance information from the network and determines routes based on the average traffic through the network. The performance information may be collected over a relatively short period of time to provide "online" adaptive routes, or the performance information may be collected over relatively long periods of time to provide "offline" routes that incorporate historical averages of traffic demands through the network. In other implementations, the data routing structures are generated using an oblivious routing algorithm, where the network controller generates the routing structures responsive to only the source and target node. In yet other implementations, the data routing structures are determined using a hybrid of the adaptive routing algorithms and the oblivious routing algorithms. For example, during periods of low traffic demand the oblivious routing algorithms may be used to generate the data routing structures, but during periods of increased demand adaptive routing algorithms may be used to generate the data routing structures. The network controller may provide the edge device with a data routing structure that includes dedicated routes for data requiring low latency. In some implementations, to increase network efficiency, the network controller collects application requirements from substantially all of the edge devices (and the applications executing thereon) before programming the switches and edge devices of the network with a plurality of data routing structures. For example, the network controller may wait for substantially all of the application requirements to be received so that it does not generate data routing structures that include conflicting routes (e.g., having a first edge device that requires a large amount of bandwidth to concurrently route data over a link that is shared with a second edge device that is executing a latency sensitive application).

Next, the edge device determines a first route (step 303). As described above, the host device of each edge device may be executing a plurality of applications, each application having different requirements. The application references the data routing structure and selects the first route responsive to the application's requirements. Continuing the above example where host 105(A) is running a first application that is latency sensitive and the second application that is bandwidth sensitive, the second application references the data routing structure to determine a route for applications with bandwidth sensitive requirements. Referring back to FIG. 1, and continuing the example, if host 105(A) is running the first application that is latency sensitive and the second application that is bandwidth sensitive, the network controller may program the switch 104(A) with four data routing structures. The four data routing structures may include: (1) a route wherein a first application data packet destined for host 105(B) uses core switch 101(D); (2) a route wherein a first application data packet destined for host 105(C) uses core switch 101(E); (3) a route wherein a second application data packet destined for host 105(B) uses core switch 101(D) and core switch 101(G); (4) a route wherein a second application data packet destined for host 105(C) uses core switch 101(D) and core switch 101(G). In this example, the application selects route (3) to route the bandwidth sensitive data packets from host 105a to host 105b. In some implementations, the selected route indicates a complete path through the network, or in the case of loose source routing, only specific points along the route.

After determining the first data route, the application encodes the data packet with the first route (step 304). For example, as the application constructs the data packet, the application may use GRE to encode the route for the data packet. In this example, the application creates a data packet with a plurality of nested headers. Upon arrival at each switch along the route, the switch removes the outermost to reveal to where it should next forward the data packet.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A method of controlling network routes, the method comprising:
   providing a network, the network comprising:
      a plurality of edge devices, each of the plurality of edge devices executing an application having an application requirement and each of the plurality of edge devices having a forwarding engine;
      a plurality of core switches interconnecting the plurality of edge devices; and
      a network controller coupled to each of the plurality of edge devices and the plurality of core switches;
   receiving, by the network controller, a plurality of application requirements during an initiation phase of the application, the plurality of application requirements including application requirements of the applications executing on the plurality of edge devices, wherein the plurality of application requirements includes at least one hard application requirement and at least one soft application requirement;
   determining, by the network controller, a plurality of routes responsive to the received application requirements;
   programming, by the network controller, the forwarding engine of each of the plurality of edge devices and a forwarding engine of each of the plurality of core switches responsive to the determined plurality of routes; and
   instructing applications that have soft application requirements to execute in response to determining that hard application requirements have been met and soft application requirements have not been met.

2. The method of claim 1, wherein the application requirement includes at least one of an edge device destination, a bandwidth requirement, and a latency requirement.

3. The method of claim 1, wherein the forwarding engine of each of the plurality of edge devices is a software-based forwarding engine.

4. The method of claim 1, wherein the forwarding engine of each of the plurality of core switches is a hardware-based forwarding engine.

5. The method of claim 1, wherein programming further comprises programming the forwarding engine of each of the plurality of edge devices and the forwarding engine of each of the plurality of core switches with the same protocol.

6. The method of claim 5, wherein the protocol is one of OpenFlow.

7. The method of claim 1, wherein programming further comprises programming the forwarding engine of each of the plurality of edge devices and the forwarding engine of each of the plurality of core switches to route data using one of source routing, multiprotocol label switching, loose source routing, and generic routing encapsulation.

8. The method of claim 1, wherein programming further comprises storing a second plurality of routes in the forwarding engine of each at least one of the edge devices for use with a second application executing on the at least one edge device.

9. A system for controlling network routes, the system comprising:
   a network comprising a plurality of edge devices, each of the plurality of edge devices executing an application having an application requirement and each of the plurality of edge devices having a forwarding engine, and a plurality of core switches interconnecting the plurality of edge devices; and
   a network controller coupled to each of the plurality of edge devices and the plurality of core switches, the network controller configured to:

receive a plurality of application requirements during an initiation phase of the application, the plurality of application requirements including application requirements of the applications executing on the plurality of edge devices, wherein the plurality of application requirements includes at least one hard application requirement and at least one soft application requirement;

determine a plurality of routes responsive to the received application requirements;

program the forwarding engine of each of the plurality of edge devices and a forwarding engine of each of the plurality of core switches responsive to the determined plurality of routes; and instruct applications that have soft application requirements to execute in response to determining that hard application requirements have been met and soft application requirements have not been met.

10. The system of claim 9, wherein the application requirement includes at least one of an edge device destination, a bandwidth requirement, and a latency requirement.

11. The system of claim 9, wherein the forwarding engine of each of the plurality of edge devices is a software-based forwarding engine.

12. The system of claim 9, wherein the forwarding engine of each of the plurality of core switches is a hardware-based forwarding engine.

13. The system of claim 9, wherein the network controller is further configured to program the forwarding engine of each of the plurality of edge devices and the forwarding engine of each of the plurality of core switches with the same protocol.

14. The system of claim 13, wherein the protocol is one of OpenFlow.

15. The system of claim 9, wherein the network controller is further configured to program the forwarding engine of each of the plurality of edge devices and the forwarding engine of each of the plurality of core switches to route data using one of source routing, multiprotocol label switching, loose source routing, and generic routing encapsulation.

16. The system of claim 9, wherein the network controller is further configured to program a second plurality of routes in the forwarding engine of each at least one of the edge devices for use with a second application executing on the at least one edge device.

17. The method of claim 1, wherein at least one of the plurality of application requirements comprises an availability of a network service.

\* \* \* \* \*